(12) United States Patent
Puterbaugh

(10) Patent No.: US 6,805,215 B2
(45) Date of Patent: Oct. 19, 2004

(54) SUSPENSION TRAVEL-LIMITING ARRANGEMENT

(75) Inventor: Benjamin S. Puterbaugh, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 51 days.

(21) Appl. No.: 10/279,299

(22) Filed: Oct. 24, 2002

(65) Prior Publication Data

US 2004/0080133 A1 Apr. 29, 2004

(51) Int. Cl.[7] .......................... B62D 24/04; B62D 33/10; B60G 9/02
(52) U.S. Cl. ................. 180/89.13; 267/66; 280/124.11; 296/190.07
(58) Field of Search .......................... 180/89.12, 89.13, 180/89.16, 352; 280/124.106, 124.111, 124.116, 124.11, 124.112, 124.113, 755; 296/190.07; 267/66, 248, 256

(56) References Cited

U.S. PATENT DOCUMENTS

| 99,867 | A | * | 2/1870 | Evans | 267/66 |
| 233,075 | A | * | 10/1880 | Conrad | 267/66 |
| 2,222,377 | A | * | 11/1940 | Slack | 180/352 |
| 2,621,920 | A | * | 12/1952 | Hogsten et al. | 267/66 |
| 3,966,223 | A | * | 6/1976 | Carr | 267/256 |
| 4,379,572 | A | * | 4/1983 | Hedenberg | 280/124.116 |
| 5,253,853 | A | * | 10/1993 | Conaway et al. | 267/256 |
| 6,109,381 | A | * | 8/2000 | Stuyvenberg et al. | 180/89.12 |

FOREIGN PATENT DOCUMENTS

JP 57026056 A * 2/1982 ............ 296/190.07

* cited by examiner

Primary Examiner—Peter C. English
(74) Attorney, Agent, or Firm—Jeffrey P. Calfa; Dennis Kelly Sullivan; Susan L. Lukasik

(57) ABSTRACT

An assembly that includes a mounted component that is suspended from a mounting component by a novel suspension-system in such a manner that relative movement between the mounted component and the mounting component is allowed only in certain directions and only within certain ranges. The novel suspension system comprises a travel-limiting link that is engaged to the mounted component at one connection point and also engaged to the mounting component at another connection point. The travel-limiting link is pivotally engaged to the mounted component at its connection point thereto and/or is pivotally engaged to the mounting component at its connection point thereto. The travel-limiting link comprises a first snubber that cooperates with a first bump-stop structure of the assembly to limit the rotation of the travel-limiting link relative to the mounted component and/or the mounting component.

10 Claims, 6 Drawing Sheets

SUSPENSION TRAVEL-LIMITING ARRANGEMENT

BACKGROUND OF THE INVENTION

The present invention relates to a novel suspension system that includes one or more linkages that connect a mounted component to a mounting component in such a manner that the mounted component may move within predefined ranges of positions relative to the mounting component.

SUMMARY OF THE INVENTION

An assembly that includes a mounted component that is suspended from a mounting component by a novel suspension-system in such a manner that relative movement between the mounted component and the mounting component is allowed only in certain directions and only within certain ranges. The novel suspension system comprises a travel-limiting link that is engaged to the mounted component at one connection point and also engaged to the mounting component at another connection point. The travel-limiting link is pivotally engaged to the mounted component at its connection point thereto and/or is pivotally engaged to the mounting component at its connection point thereto. The travel-limiting link comprises a first snubber that cooperates with a first bump-stop structure of the assembly to limit the rotation of the travel-limiting link relative to the mounted component and/or the mounting component.

DRAWINGS

Other objects and advantages of the invention will become more apparent upon perusal of the detailed description thereof and upon inspection of the drawings in which.

DETAILS OF INVENTION

Figure 1:
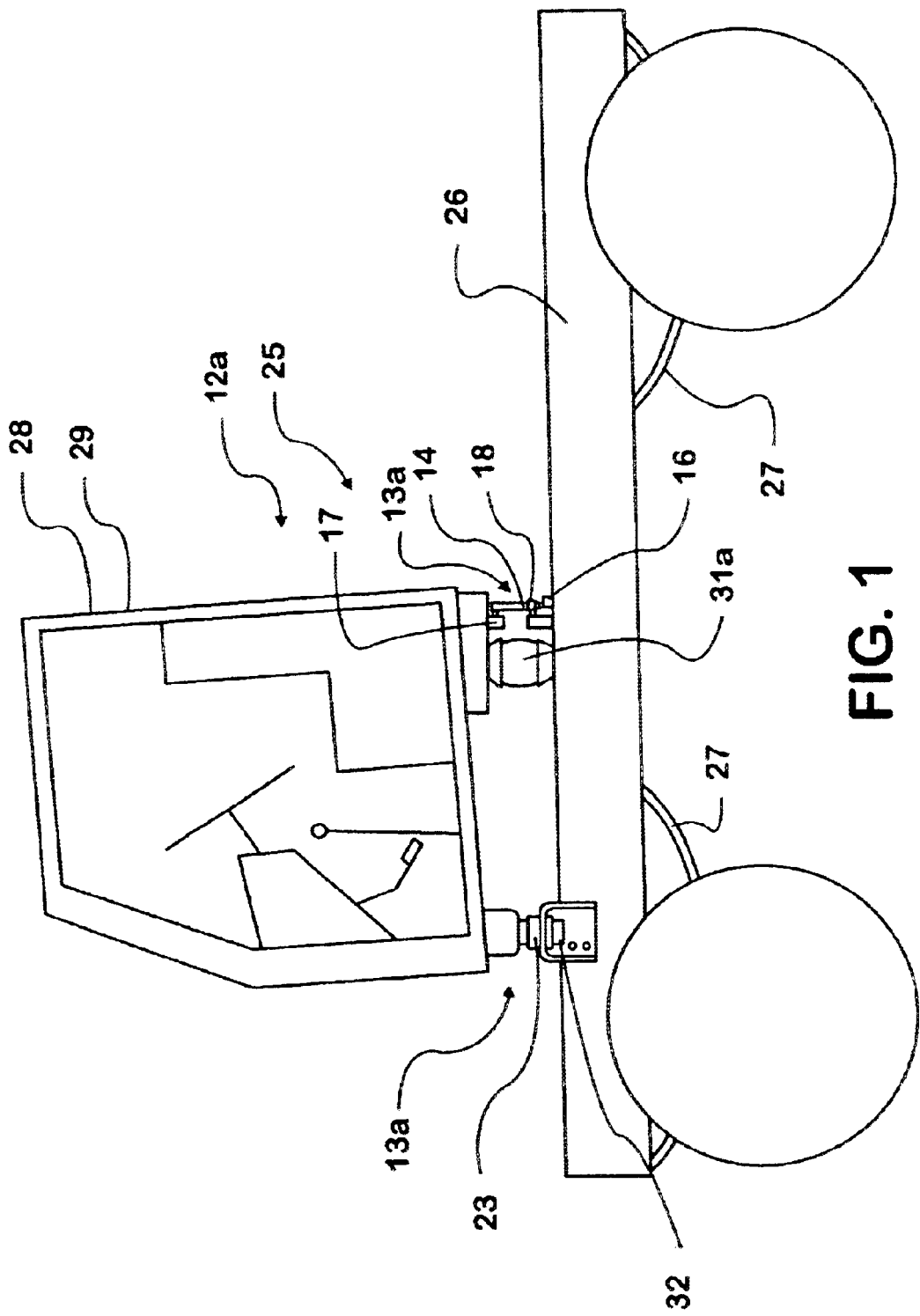
FIG. 1 is a side elevational view of a vehicle that includes an operator cabin that is supported by a first embodiment of a novel suspension-system according to the present invention from a frame structure of the vehicle.

The present invention is an assembly 12a (FIGS. 1, 2), 12b (FIGS. 3–6) that includes a mounted component 29 (FIGS. 1, 2), 26 (FIGS. 3–6) that is supported from a mounting component 26 (FIGS. 1, 2), 50 (FIGS. 3–6) by a novel suspension-system 13a (FIGS. 1, 2), 13b (FIGS. 3–6) that allows relative movement between the mounted component 29 (FIGS. 1, 2), 26 (FIGS. 3–6) and the mounting component 26 (FIGS. 1, 2), 50 (FIGS. 3–6) only in certain directions and only within certain ranges of relative positions. Embodiments of the present invention and components thereof are illustrated in FIGS. 1–6. Many different constructions of suspension systems that attach a mounted component 29 (FIGS. 1, 2), 26 (FIGS. 3–6) to a mounting component 26 (FIGS. 1, 2), 50 (FIGS. 3–6) in such a manner to allow for relative movement between them in only certain directions and only within certain ranges are well-known to and/or easily imaginable by a person of ordinary skill in the art. The general manner of construction of a novel suspension-system 13a (FIGS. 1, 2), 13b (FIGS. 3–6) according to the present invention may be in accordance with any of the aforementioned designs of suspension systems that are well-known to and/or easily imaginable by one of ordinary skill in the art.

A novel suspension-system 13a (FIGS. 1, 2), 13a (FIGS. 3–6) of an assembly 12a (FIGS. 1, 2), 12b (FIGS. 3–6) according to the present invention includes a travel-limiting link 14 that is engaged to the mounted component 29 (FIGS. 1, 2), 26 (FIGS. 3–6) at a connection point 15 and that is also engaged to the mounting component 26 (FIGS. 1, 2), 50 (FIGS. 3–6) at a connection point 15. The travel-limiting link 14 has a spanning portion 18 that extends between the connection point 15 at which it is engaged to the mounted component 29 (FIGS. 1, 2), 26 (FIGS. 3–6) and the connection point 15 at which it is engaged to the mounting component 26 (FIGS. 1, 2), 50 (FIGS. 3–6). The travel-limiting link 14 is pivotally engaged to at least one of the mounted component 29 (FIGS. 1, 2), 26 (FIGS. 3–6) and the mounting component 26 (FIGS. 1, 2), 50 (FIGS. 3–6) at its connection point 15 thereto. In some embodiments of the present invention, the travel-limiting link 14 may be pivotally connected to only one of the mounting component 26 (FIGS. 1, 2), 50 (FIGS. 3–6) and the mounted component 29 (FIGS. 1, 2), 26 (FIGS. 3–6) at its connection point 15 thereto. In such embodiments of the invention the travel-limiting link 14 may be engaged to whichever of the mounting component 26 (FIGS. 1, 2), 50 (FIGS. 3–6) and the mounted component 29 (FIGS. 1, 2), 26 (FIGS. 3–6) it is not pivotally engaged to in any of innumerable different ways. Alternatively, the travel-limiting link 14 may be pivotally engaged to the mounting component 26 (FIGS. 1, 2), 50 (FIGS. 3–6) at its connection point 15 thereto and also pivotally engaged to the mounted component 29 (FIGS. 1, 2), 26 (FIGS. 3–6) at its connection point 15 thereto, as is illustrated in FIGS. 1–6. The pivotal connections 19 between the travel-limiting link 14 and the mounting component 26 (FIGS. 1, 2), 50 (FIGS. 3–6) and/or mounted component 29 (FIGS. 1, 2), 26 (FIGS. 3–6) constitute a portion of all of the moveable connections between the components of the novel suspension-system 13a (FIGS. 1, 2), 13b (FIGS. 3–6) and the mounting component 26 (FIGS. 1, 2), 50 (FIGS. 3–6) and the mounted component 29 (FIGS. 1, 2), 26 (FIGS. 3–6) that allow for constrained relative movement of the mounting component 26 (FIGS. 1, 2), 50 (FIGS. 3–6) relative to the mounted component 29 (FIGS. 1, 2), 26 (FIGS. 3–6).

The travel-limiting link 14 of a novel suspension-system 13a (FIGS. 1, 2), 13b (FIGS. 3–6) according to the present invention comprises a first snubber 21 that is disposed adjacent a pivotal connection 19 of the travel-limiting link 14 to either the mounting component 26 (FIGS. 1, 2), 50 (FIGS. 3–6) or the mounted component 29 (FIGS. 1, 2), 26 (FIGS. 3–6). The first snubber 21 is disposed upon a side of the pivotal connection 19 that it is disposed adjacent, which is opposite the spanning portion 18 of the travel-limiting link 14. An assembly 12a (FIGS. 1, 2), 12b (FIGS. 3–6) according to the present invention also comprises a first hump-stop structure 16 that is engaged to and/or is part of either said mounting component 26 (FIGS. 1, 2), 50 (FIGS. 3–6) or said mounted component 29 (FIGS. 1, 2), 26 (FIGS. 3–6). The first bump-stop structure 16 is disposed in such a position that, when relative rotation occurs between the travel-limiting link 14 and whichever of the mounted component 29 (FIGS. 1, 2), 26 (FIGS. 3–6) and the mounting component 26 (FIGS. 1, 2), 50 (FIGS. 3–6) the travel-limiting link 14 is connected to through the pivotal connection 19 that is adjacent the first snubber 21, the first bump-stop structure 16 is disposed within the path of travel of the first snubber 21. Thus, the range of angular positions of the travel-limiting link 14 relative to whichever of the mounting component 26 (FIGS. 1, 2), 50 (FIGS. 3–6) and the mounted component 29 (FIGS. 1, 2), 26 (FIGS. 3–6) it is pivotally connected to at the pivotal connection 19 adjacent the first snubber 21 is limited because, as the travel-limiting link 14 rotates in such a direction that the first snubber 21 moves toward the first bump-stop structure 16, the first snubber 21 will eventually abut the first bump-stop structure 16. As is illustrated in FIGS. 1–6, the relative positions of the first snubber 21 and the first bump-stop structure 16 may be such that the contact one another as a result of and limit travel of the mounted component 29 (FIGS. 1, 2), 26 (FIGS. 3–6) away from the mounting component 26 (FIGS. 1, 2), 50 (FIGS. 3–6). Such travel of the mounted component 29 (FIGS. 1, 2), 26 (FIGS. 3–6) away from the mounting component 26 (FIGS. 1, 2), 50 (FIGS. 3–6) is generally referred to as rebound. Thus, a first snubber 21 and a first bump-stop structure 16 that engage each other as a result of the mounted component 29 (FIGS. 1, 2), 26 (FIGS. 3–6) moving away from the mounting component 26 (FIGS. 1, 2), 50 (FIGS. 3–6) establish a rebound limit which is a relative position between the mounted component 29 (FIGS. 1, 2), 26 (FIGS. 3–6) and the mounting component 26 (FIGS. 1, 2), 50 (FIGS. 3–6) at which the first snubber 21 is in contact with the first bump-stop structure and further rebound, or travel of the mounted component 29 (FIGS. 1, 2), 26 (FIGS. 3–6) away from the mounting component 26 (FIGS. 1, 2), 50 (FIGS. 3–6) is prevented. Alternatively, the relative positions of the first snubber 21 and the first hump-stop structure 16 may be such that they contact one another as a result of and limit travel of the mounted component 29 (FIGS. 1, 2), 26 (FIGS. 3–6) toward the mounting component 26 (FIGS. 1, 2), 50 (FIGS. 3–6). Such travel of the mounted component 29 (FIGS. 1, 2), 26 (FIGS. 3–6) toward the mounting component 26 (FIGS. 1, 2), 50 (FIGS. 3–6) is generally referred to as jounce. Thus, a first snubber 21 and a first bump-stop structure 16 that engage each other as a result of the mounted component 29 (FIGS. 1, 2), 26 (FIGS. 3–6) moving toward the mounting component 26 (FIGS. 1, 2), 50 (FIGS. 3–6) establish a jounce limit which is a relative position between the mounted component 29 (FIGS. 1, 2), 26 (FIGS. 3–6) and the mounting component 26 (FIGS. 1, 2), 50 (FIGS. 3–6) at which the first snubber 21 is in contact with the first bump-stop structure 16 and further jounce, or travel of the mounted component 29 (FIGS. 1, 2), 26 (FIGS. 3–6) toward the mounting component 26 (FIGS. 1, 2), 50 (FIGS. 3–6) is prevented.

Some embodiments of a novel-suspension system 13a (FIGS. 1, 2), 13b (FIGS. 3–6) according to the present invention include one or more springs 30 (FIGS. 5, 6), 31a (FIGS. 1, 2), 31b (FIG. 3) that are constructed and engaged to both the mounted component 29 (FIGS. 1, 2), 26 (FIGS. 3–6) and the mounting component 26 (FIGS. 1, 2), 50 (FIGS. 3–6) in such a manner that they provide significant resistance to jounce, but limited resistance to rebound. Such a functionality of springs 30 (FIGS. 5, 6), 31a (FIGS. 1, 2), 31b (FIG. 3) of a novel-suspension-system 13a (FIGS. 1, 2), 13b (FIGS. 3–6) may result from the springs 30 (FIGS. 5, 6), 31a (FIGS. 1, 2), 31b (FIG. 5) having relatively little stiffness and/or strength in tension. For instance, many embodiments of the novel suspension-system 13a (FIGS. 1, 2), 13b (FIGS. 3–6) of the present invention, such as those shown in FIGS. 1, 2, will include flexible-chamber air springs 31a such as are commonly used in the suspension systems of heavy-duty truck vehicles and which have negligible stiffness and strength in tension. Some embodiments of novel suspension-systems 13a (FIGS. 1, 2), 13b (FIGS. 3–6) according to the present invention include springs 30 (FIGS. 5, 6), 31a (FIGS. 1, 2), 31b (FIG. 3) that have considerable stiffness and strength in tension, but have engagements to the mounted component 29 (FIGS. 1, 2), 26 (FIGS. 3–6) and or mounting component 26 (FIGS. 1, 2), 50 (FIGS. 3–6) that are such that, in jounce the springs SO (FIGS. 5, 6), 31a (FIGS. 1, 2), 31b (FIG. 3) can apply resistive forces to the mounted component 29 (FIGS. 1, 2), 26 (FIGS. 3–6) and/or the mounting component, but in rebound the springs 30 (FIGS. 5, 6), 31a (FIGS. 1, 2). 31b (FIG. 5) cannot apply resistive forces to the mounted component 29 (FIGS. 1, 2), 26 (FIGS. 3–6) and/or the mounting component 26 (FIGS. 1, 2), 50 (FIGS. 3–6). For instance, a spring 30 (FIGS. 5, 6), 31a (FIGS. 1, 2), 31b (FIG. 3) may be engaged to a mounted component 29 (FIGS. 1, 2), 26 (FIGS. 3–6) or a mounted component through abutment in only one direction. In such a construction, the spring 30 (FIGS. 5, 6), 31a (FIGS. 1, 2), 31b (FIG. 3) can apply resistive forces in the direction of abutment between the spring 30 (FIGS. 5, 6), 31a (FIGS. 1, 2), 31b (FIG. 3) and the mounted component 29 (FIGS. 1, 2), 26 (FIGS. 3–6) or the mounting component 26 (FIGS. 1, 2), 50 (FIGS. 3–6), but not in the opposite direction. In embodiments of navel suspension-systems 13a (FIGS. 1, 2), 13b (FIGS. 3–6) that include springs so (FIGS. 5, 6), 31a (FIGS. 1, 2), 31b (FIG. 3) that are constructed and/or engaged to the mounted component 29 (FIGS. 1, 2), 26 (FIGS. 3–6) and the mounting component 26 (FIGS. 1, 2), 50 (FIGS. 3–6) in such a manner that they provide relatively little resistance to rebound a first snubber 21 and a first bump-stop structure 16 and/or a second snubber 22 and second bump-stop structure 17 that function to define a rebound limit advantageously provide the resistance to rebound that the springs SO (FIGS. 5, 6), 31a (FIGS. 1, 2), 31b (FIG. 3) do not.

As was mentioned above, the construction and engagement to the mounted component 29 (FIGS. 1, 2), 26 (FIGS. 3–6) and the mounting component 26 (FIGS. 1, 2), 50 (FIGS. 3–6) of those components of a novel suspension-system 13a (FIGS. 1, 2), 13b (FIGS. 3–6) other than the travel-limiting link 14 which includes the first snubber 21 may be of any of a number of different designs that are well-known to and/or easily imaginable by a person of ordinary skill in the art. In many embodiments of the present invention, such as those shown in FIGS. 1–6 the novel suspension-system 13a (FIGS. 1, 2), 13b (FIGS. 3–6) connects the mounted component 29 (FIGS. 1, 2), 26 (FIGS. 3–6) to the mounting component 26 (FIGS. 1, 2), 60 (FIGS. 3–6) in such a manner that they are pivotally moveable relative to one another about a novel suspension-system primary pivot-axis 23. Many such embodiments of the present invention, such as those shown in FIGS. 1–6, also include springs 30 (FIGS. 5, 6), 31a (FIGS. 1, 2), 31b (FIG. 3) that are engaged between the mounted component 29 (FIGS. 1, 2), 26 (FIGS. 3–6) and the mounting component 26 (FIGS. 1, 2), 50 (FIGS. 3–6) in such a manner to resist relative rotation therebetween about the novel suspension-system primary pivot-axis 23. There are many different constructions of suspension system components that are well-known to and/or easily imaginable by a person of ordinary skill in the art that would effect such a pivotal engagement of the mounted component 29 (FIGS. 1, 2), 26 (FIGS. 3–6) to the mounting component 26 (FIGS. 1, 2), 50 (FIGS. 3–6) at a novel suspension-system primary pivot-axis 23. In some embodiments of the present invention, such as those shown in FIGS. 3–6, the mounted component 29 (FIGS. 1, 2), 26 (FIGS. 3–6) is engaged to the mounting component 26 (FIGS. 1, 2), 50 (FIGS. 3–6) through hinge pins or bolts that are co-axial with the novel suspension-system primary pivot-axis 23. In other embodiments of the present invention, such as those shown in FIGS. 1 and 2, the mounted component 29 (FIGS. 1, 2), 26 (FIGS. 3–6) is connected to the mounting component 26 (FIGS. 1, 2), 50 (FIGS. 3–6) through a pair of relatively flexible connections that are spaced from one another and that cooperate to allow relative pivoting of the mounted component 29 (FIGS. 1, 2), 26 (FIGS. 3–6) and the mounting component 26 (FIGS. 1, 2), 50 (FIGS. 3–6) about an axis which extends through them while preventing substantial relative movement of the mounted component 29 (FIGS. 1, 2), 26 (FIGS. 3–6) and the mounting component 26 (FIGS. 1, 2), 50 (FIGS. 3–6) in other directions. Thus, in such embodiments of the present invention a novel suspension-system primary pivot-axis 23 about which relative pivoting of the mounted component 29 (FIGS. 1, 2), 26 (FIGS. 3–6) and the mounting component 26 (FIGS. 1, 2), 50 (FIGS. 3–6) is allowed is defined through the pair of relatively flexible connections 32 of the mounted component 29 (FIGS. 1, 2), 26 (FIGS. 3–6) to the mounting component 26 (FIGS. 1, 2), 50 (FIGS. 3–6). Constructions of suspension-systems 13a (FIGS. 1, 2), 13b (FIGS. 3–6) that pivotally engage a mounted component 29 (FIGS. 1, 2), 26 (FIGS. 3–6) to a mounting component 26 (FIGS. 1, 2), 50 (FIGS. 3–6) about a suspension-system primary pivot-axis through a spaced-apart pair of relatively flexible connections that define a suspension-system primary pivot-axis are commonly utilized in the suspension of an operator cabin of a heavy-duty truck vehicle from the frame structure thereof. In such applications the spaced-apart pair of relatively flexible connections of the mounted component 29 (FIGS. 1, 2), 26 (FIGS. 3–6) (the operator cabin) to the mounting component 26 (FIGS. 1, 2), 50 (FIGS. 3–6) (the frame structure) are generally disposed upon opposite lateral sides of the heavy-duty truck vehicle adjacent a forward portion of the operator cabin and thus define the suspension-system primary pivot-axis as horizontal and transverse to the longitudinal axis of the heavy-duty truck vehicle. In many such applications the rear portion of the operator cabin is supported by springs that are disposed between the lower rear portion of the operator cabin and the frame structure.

Figure 2:
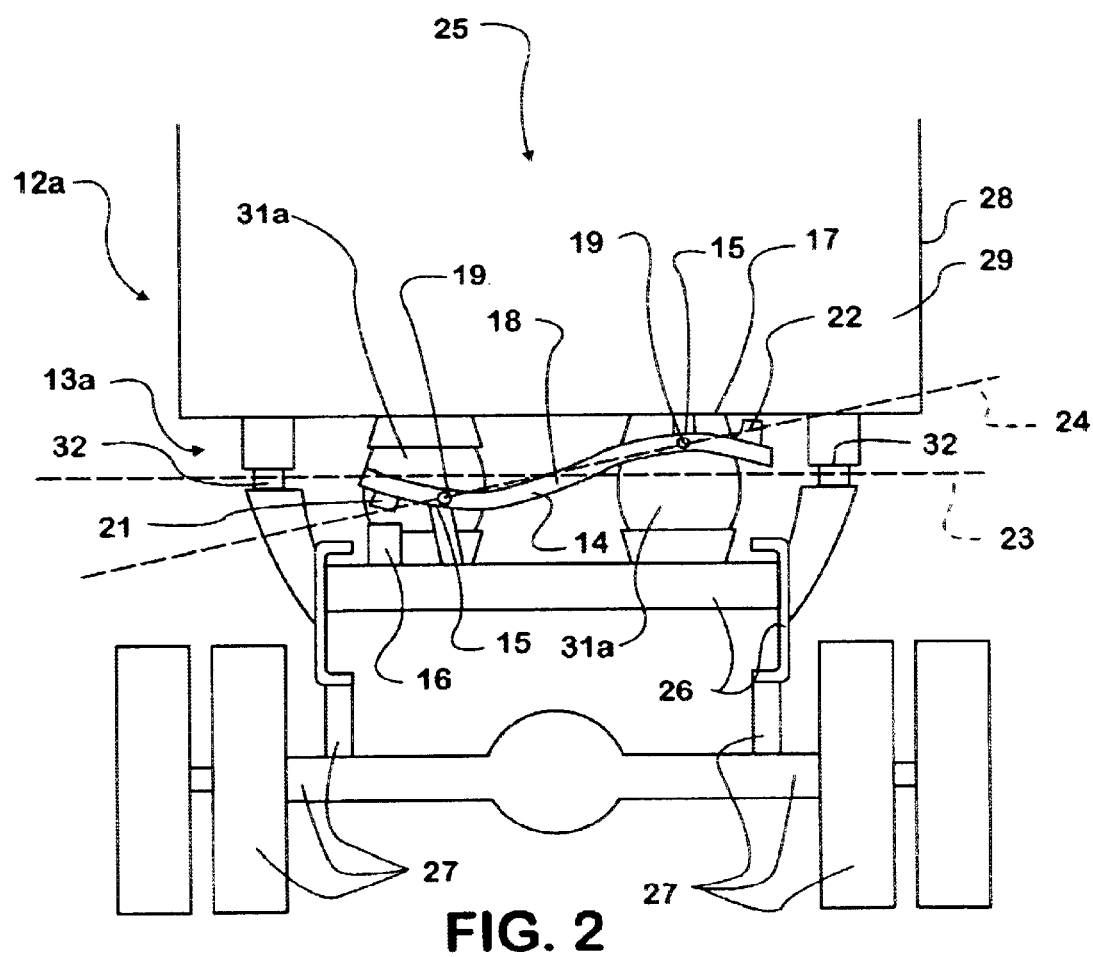
FIG. 2 is a rear close-up view of the novel suspension-system of the embodiment shown in FIG. 1.
Figure 3:
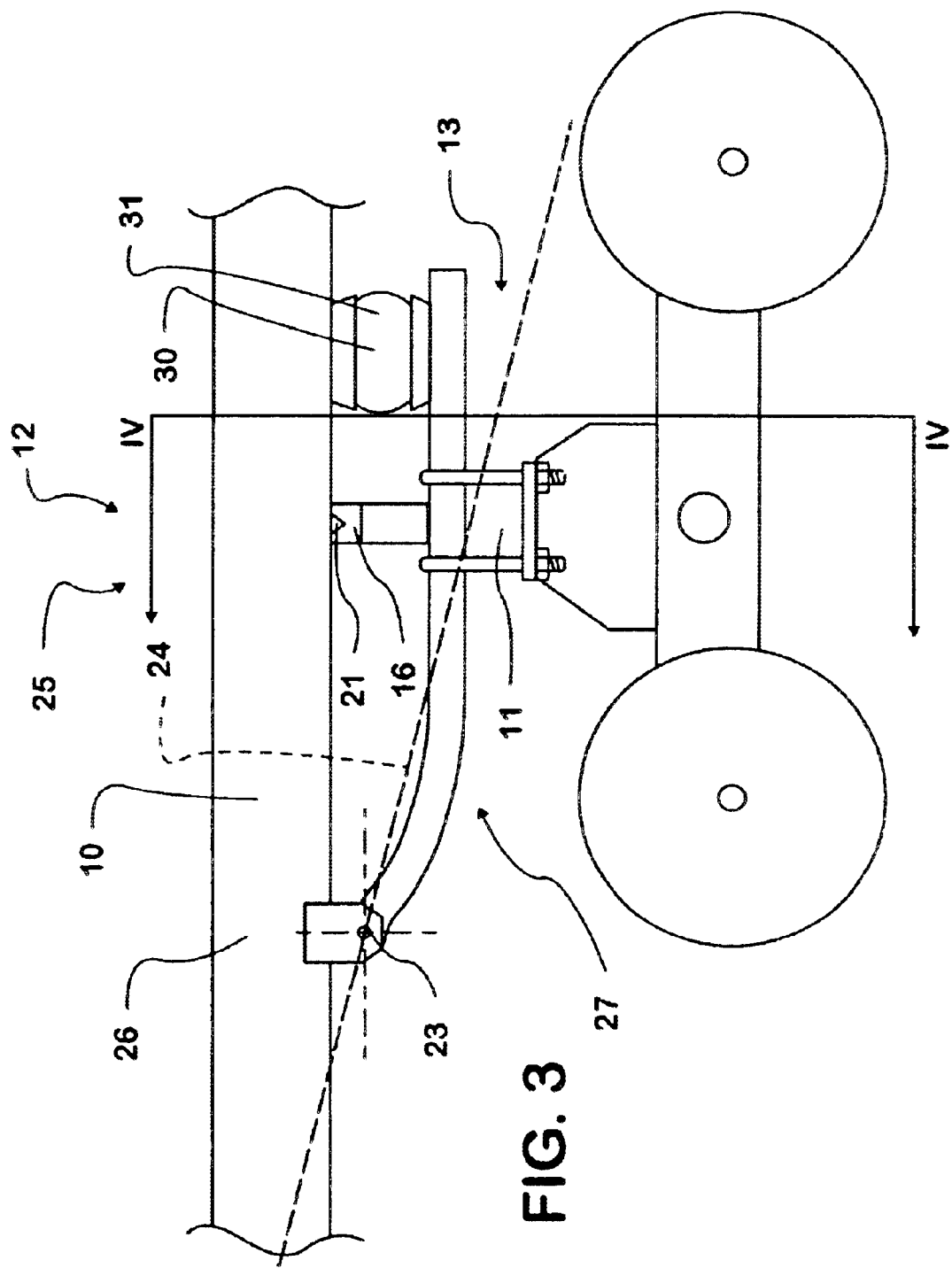
FIG. 3 is a view of an assembly according to the present invention including a second embodiment of a novel suspension-system according to the present invention that is a frame-suspension system of a vehicle.
Figure 4:
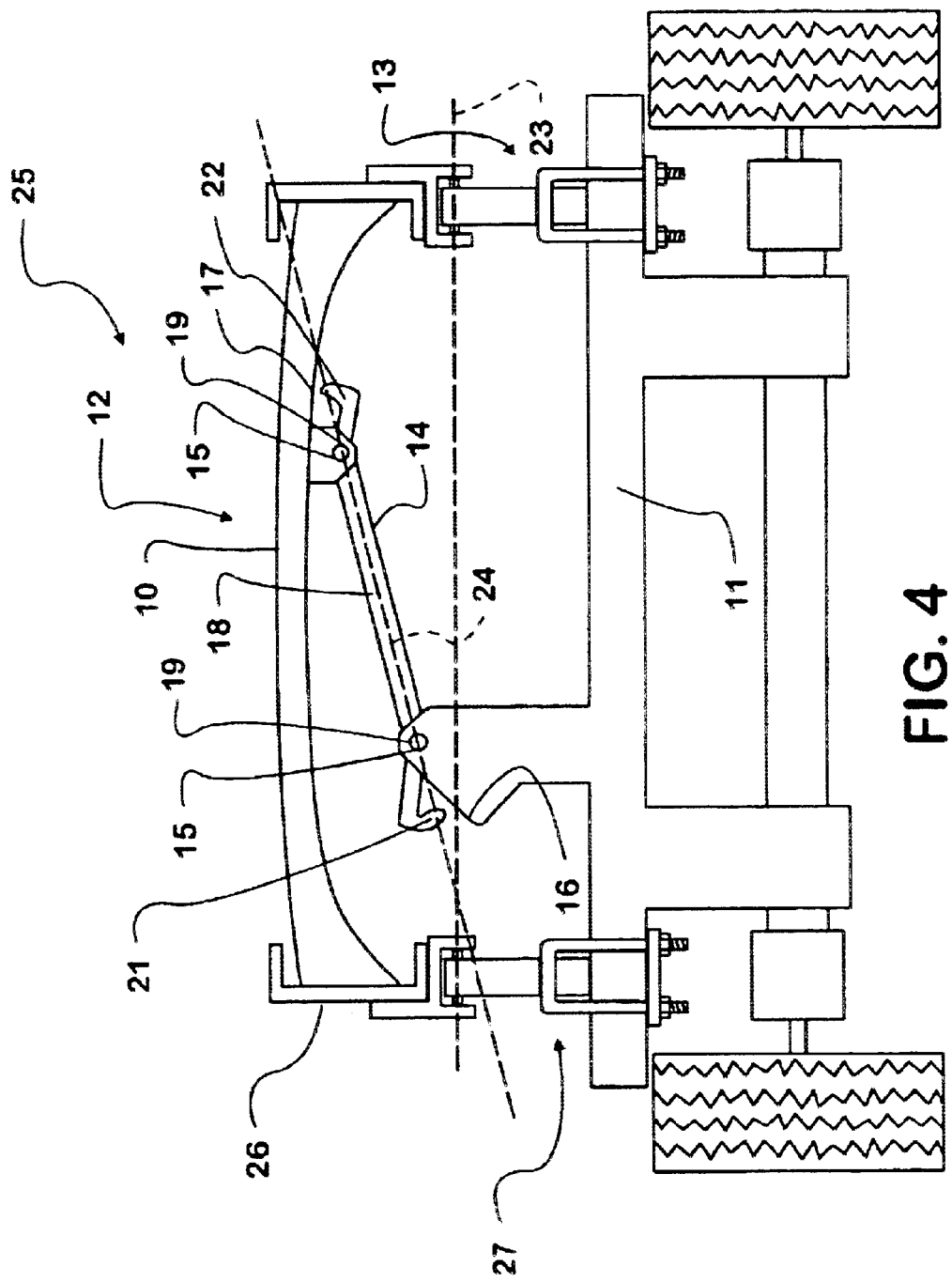
FIG. 4 is sectional view through line IV—IV of FIG. 3.
Figure 5:
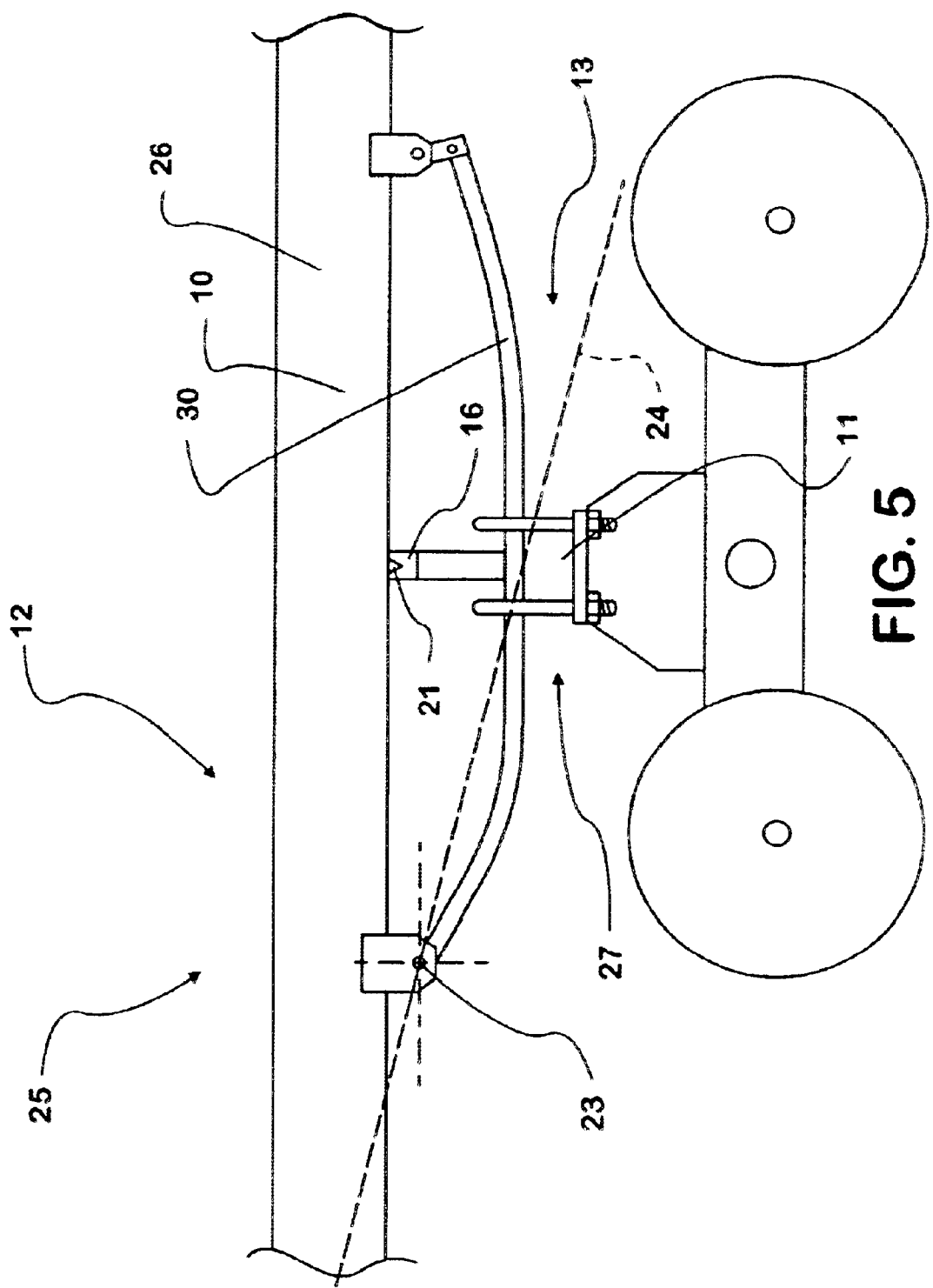
FIG. 5 is a view of an assembly according to the present invention including a third embodiment of a novel suspension-system according to the present invention that is a frame-suspension system of a vehicle.
Figure 6:
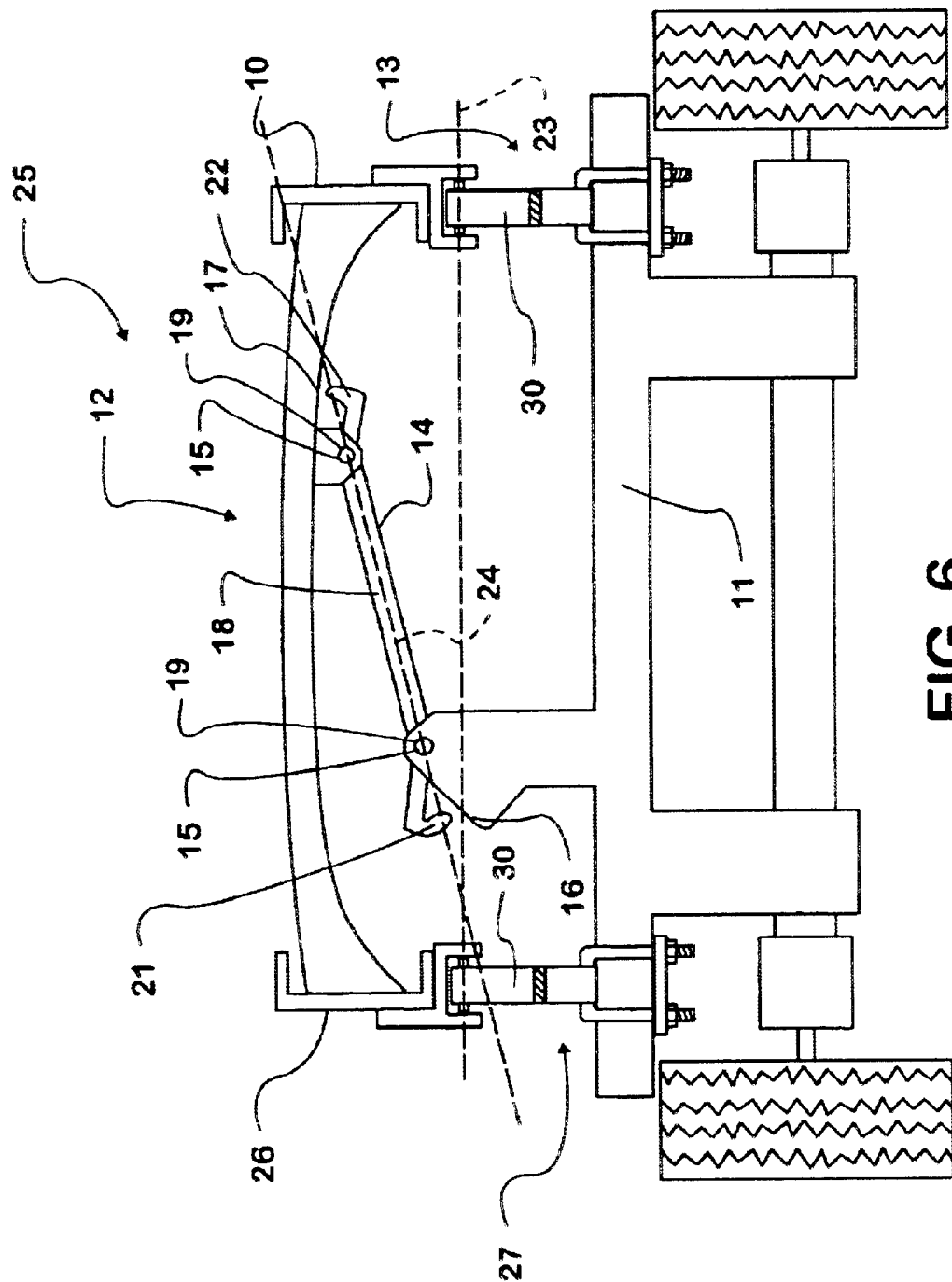
FIG. 6 is a sectional view through of the assembly shown in FIG. 5.

In some embodiments of the present invention, such as those shown in FIGS. 1 and 2, a vehicle 25 according thereto comprises a body structure 28 that is an operator cabin 29 and that is further a mounted component 29 (FIGS. 1, 2) which is supported by a novel suspension-system 13a according to the present invention from a mounting component that is a frame structure 26 of the vehicle 25. In some such embodiments of the present invention a forward lower portion of the operator cabin 28 is pivotally engaged to the frame structure 26 about a novel suspension-system primary pivot-axis that extents transverse to the longitudinal axis of the vehicle 25. In some such embodiments of the present invention the travel-limiting link 14 of the novel suspension-system 13a (FIGS. 1, 2) is engaged at one connection point 15 to the lower rear portion of the operator cabin 29 and at the other connection point to the frame structure 26 of the vehicle 25. In some such embodiments of the present invention travel-limiting link 14 is positioned such that there is less than a 30 degree angle between the novel suspension-system primary pivot-axis 23 and the connection-point axis 24 that extends through the connection points 15 of the travel-limiting link 14 to the operator cabin 29 and the frame structure 26. In some such embodiments of the present invention the travel-limiting link 14 is pivotally engaged to the operator cabin 29 at its connection point 15 thereto ant is also pivotally engaged to the frame structure 26 at its connection point 15 thereto. In some such embodiments of the present invention the novel suspension-system 13a (FIGS. 1, 2) comprises flexible-chamber air springs 31a that are engaged between the lower rear portion of the operator cabin 29 and the frame structure 26 and that support the rear of the operator cabin 29. In some embodiments of the present invention, such as those shown in FIGS. 1 and 2, the first bump-stop structure 16 is defined by the rear lower portion of the operator cabin 29 or by the frame structure 26 of the vehicle 25. In some of those embodiments of the present invention, such as those shown in FIGS. 1 and 2, whichever of the rear lower portion of the operator cabin 29 and the frame structure 26 does not define the first-bump stop structure 16 defines the second bump-stop structure 17.

We claim:

1. An assembly comprising:

(a) a mounted component that is mounted to a mounting component through a first suspension system in such a manner that the mounted component may move within predefined ranges of positions relative to said mounting component;

(b) wherein said first suspension system comprises a travel-limiting link that is engaged directly or indirectly to said mounting component at a first connection point and is engaged directly or indirectly to said mounted component at a second connection point;

(c) wherein said travel-limiting link comprises a spanning portion that extends between said first connection point and said second connection point;

(d) wherein both of said connection points are pivotal connections about which said travel-limiting link may pivot relative to said mounting component and said mounted component;

(e) wherein said travel-limiting link comprises a first snubber that is disposed adjacent one of said pivotal connections and upon a side of said one pivotal connection opposite said spanning portion of said travel-limiting link;

(f) wherein either said mounting component or said mounted component comprises a first bump-stop structure that is disposed in such a position that when said travel-limiting link rotates about said pivotal connections as said mounted component moves away from said mounting component said first snubber moves toward said first bump-stop structure and when said travel-limiting link rotates about said pivotal connections as said mounted component moves toward said mounting component said first snubber moves away from said first bump-stop structure;

(g) wherein said first suspension system comprises one or more flexible-chamber air springs that are engaged between said mounting component and said mounted component in such a manner that they provide substantial jounce resistance and limited rebound resistance; and (h) wherein said mounted component is pivotally engaged to said mounting component about a suspension-system primary pivot-axis that is disposed at a distance from and at an angle of less than 30 degrees relative to a connection-point axis that extends through said connection points at which said travel-limiting link is connected to said mounted component and said mounting component.

2. The assembly of claim 1, wherein:
(a) said suspension-system primary pivot-axis and said connection-point axis are both
disposed at angles of less than 30 degrees relative to horizontal.

3. The assembly of claim 2, wherein:
(a) said assembly is a vehicle;
(b) said vehicle comprises one or more rigid frame structures to which a majority of other components of said vehicle are directly or indirectly engaged and from which a majority of other components of said vehicle derive support directly or indirectly;
(c) said vehicle comprises a frame-suspension system that is engaged to said one or more frame structures and that provides said one or more frame structures with support above the ground;
(d) said frame-suspension system is constructed in such a manner to provide said vehicle with a relatively low resistance to movement along the ground;
(e) said vehicle comprises one or more body structures that are mounted to and supported by said one or more frame structures of said vehicle;
(f) one of said body structures of said vehicle is an operator cabin which is also said mounted component;
(g) one of said one or more frame structures of said vehicle is said mounting component; and
(h) said first suspension system supports said operator cabin from said one frame structure in such a manner that said operator cabin can move vertically relative to said one frame structure.

4. The assembly of claim 3, wherein:
(a) said suspension-system primary pivot-axis is disposed transverse to a longitudinal axis of said vehicle and at a forward portion of said operator cabin; and
(b) said travel-limiting link is engaged at one of its connection points to a lower rear portion of said operator cabin and at the other of its connection points to said one frame structure.

5. The assembly of claim 4, wherein:
(a) said first bump-stop structure is either a downwardly facing portion of said lower rear portion of said operator cabin or an upwardly facing portion of said one frame structure.

6. The assembly of claim 5, wherein:
(a) said travel-limiting link comprises a second snubber that is disposed adjacent whichever of said pivotal connections said first snubber is not adjacent;
(b) said second snubber is disposed upon a side of said pivotal connection that it is adjacent opposite said spanning portion of said travel-limiting link;
(c) said mounting component or said mounted component comprises a second bump-stop structure that is disposed in such a position that when said travel-limiting link pivots about said pivotal connections as said mounted component moves away from said mounting component said second snubber moves toward said second bump-stop structure and when said travel-limiting link pivots about said pivotal connections as said mounted component moves toward said mounting component said second snubber moves away from said second bump-stop structure; and
(d) said first bump-stop structure and said second bump-stop structure are positioned such that, when relative rotation occurs between said travel-limiting link and whichever of said mounted component and said mounting component said travel-limiting link is pivotally engaged to through said pivotal connection adjacent said second snubber, said second bump-stop structure is disposed within a path of travel of said second snubber.

7. The assembly of claim 6, wherein:
(a) said one or more flexible-chamber air springs are mounted between said lower rear portion of said cabin and said one frame structure.

8. An assembly comprising:
(a) a mounted component that is mounted to a mounting component through a first suspension system in such a manner that the mounted component may move within predefined ranges of positions relative to said mounting component;
(b) wherein said first suspension system comprises a travel-limiting link that is engaged directly or indirectly to said mounting component at a first connection point and is engaged directly or indirectly to said mounted component at a second connection point;
(c) wherein said travel-limiting link comprises a spanning portion that extends between said first connection point and said second connection point;
(d) wherein both of said connection points are pivotal connections about which said travel-limiting link may pivot relative to said mounting component and said mounted component;
(e) wherein said travel-limiting link comprises a first snubber that is disposed adjacent one of said pivotal connections and upon a side of said one pivotal connection opposite said spanning portion of said travel-limiting link;
(f) wherein either said mounting component or said mounted component comprises a first bump-stop structure that is disposed in such a position that when said travel-limiting link rotates about said pivotal connections as said mounted component moves away from said mounting component said first snubber moves toward said first bump-stop structure and when said travel-limiting link rotates about said pivotal connections as said mounted component moves toward said mounting component said first snubber moves away from said first bump-stop structure;
(g) wherein said travel-limiting link comprises a second snubber that is disposed adjacent whichever of said pivotal connections said first snubber is not adjacent;
(h) wherein said second snubber is disposed upon a side of said pivotal connection that it is adjacent opposite said spanning portion of said travel-limiting link;
(i) wherein said mounting component or said mounted component comprises a second bump-stop structure that is disposed in such a position that when said travel-limiting link pivots about said pivotal connections as said mounted component moves away from said mounting component said second snubber moves toward said second bump-stop structure and when said travel-limiting link pivots about said pivotal connections as said mounted component moves toward said mounting component said second snubber moves away from said second bump-stop structure; and (j) wherein said first bump-stop structure and said second bump-stop structure are positioned such that, when said mounted component moves away from said mounting component to a rebound limit said first snubber contacts said first bump-stop structure and said second snubber contacts said second bump-stop structure.

9. An assembly comprising:

(a) a mounted component that is mounted to a mounting component through a first suspension system in such a manner that the mounted component may move within predefined ranges of positions relative to said mounting component;

(b) wherein said first suspension system comprises a travel-limiting link that is engaged directly or indirectly to said mounting component at a first connection point and is engaged directly or indirectly to said mounted component at a second connection point;

(c) wherein said travel-limiting link comprises a spanning portion that extends between said first connection point and said second connection point;

(d) wherein both of said connection points are pivotal connections about which said travel-limiting link may pivot relative to said mounting component and said mounted component;

(e) wherein said travel-limiting link comprises a first snubber that is disposed adjacent one of said pivotal connections and upon a side of said one pivotal connection opposite said spanning portion of said travel-limiting link;

(f) wherein either said mounting component or said mounted component comprises a first bump-stop structure that is disposed in such a position that when said travel-limiting link rotates about said pivotal connections as said mounted component moves away from said mounting component said first snubber moves toward said first bump-stop structure and when said travel-limiting link rotates about said pivotal connections as said mounted component moves toward said mounting component said first snubber moves away from said first bump-stop structure;

(g) wherein said first suspension system comprises one or more springs that are constructed and engaged between said mounted component and said mounting component in such a manner that they provide substantial jounce resistance and limited rebound resistance;

(h) wherein said travel-limiting link comprises a second snubber that is disposed adjacent whichever of said pivotal connections said first snubber is not adjacent;

(i) wherein said second snubber is disposed upon a side of said pivotal connection that it is adjacent opposite said spanning portion of said travel-limiting link;

(j) wherein said mounting component or said mounted component comprises a second bump-stop structure that is disposed in such a position that when said travel-limiting link pivots about said pivotal connections as said mounted component moves away from said mounting component said second snubber moves toward said second bump-stop structure and when said travel-limiting link pivots about said pivotal connections as said mounted component moves toward said mounting component said second snubber moves away from said second bump-stop structure; and (k) wherein said first bump-stop structure and said second bump-stop structure are positioned such that, when said mounted component moves away from said mounting component to a rebound limit said first snubber contacts said first bump-stop structure and said second snubber contacts said second bump-stop structure.

10. An assembly comprising:

(a) a mounted component that is mounted to a mounting component through a first suspension system in such a manner that the mounted component may move within predefined ranges of positions relative to said mounting component;

(b) wherein said first suspension system comprises a travel-limiting link that is engaged directly or indirectly to said mounting component at a first connection point and is engaged directly or indirectly to said mounted component at a second connection point;

(c) wherein said travel-limiting link comprises a spanning portion that extends between said first connection point and said second connection point;

(d) wherein both of said connection points are pivotal connections about which said travel-limiting link may pivot relative to said mounting component and said mounted component;

(e) wherein said travel-limiting link comprises a first snubber that is disposed adjacent one of said pivotal connections and upon a side of said one pivotal connection opposite said spanning portion of said travel-limiting link;

(f) wherein either said mounting component or said mounted component comprises a first bump-stop structure that is disposed in such a position that when said travel-limiting link rotates about said pivotal connections as said mounted component moves away from said mounting component said first snubber moves toward said first bump-stop structure and when said travel-limiting link rotates about said pivotal connections as said mounted component moves toward said mounting component said first snubber moves away from said first bump-stop structure;

(g) wherein said first suspension system comprises one or more flexible-chamber air springs that are engaged between said mounting component and said mounted component in such a manner that they provide substantial jounce resistance and limited rebound resistance;

(h) wherein said travel-limiting link comprises a second snubber that is disposed adjacent whichever of said pivotal connections said first snubber is not adjacent;

(i) wherein said second snubber is disposed upon a side of said pivotal connection that it is adjacent opposite said spanning portion of said travel-limiting link;

(j) wherein said mounting component or said mounted component comprises a second bump-stop structure that is disposed in such a position that when said travel-limiting link pivots about said pivotal connections as said mounted component moves away from said mounting component said second snubber moves toward said second bump-stop structure and when said travel-limiting link pivots about said pivotal connections as said mounted component moves toward said mounting component said second snubber moves away from said second bump-stop structure; and (k) wherein said first bump-stop structure and said second bump-stop structure are positioned such that, when said mounted component moves away from said mounting component to a rebound limit said first snubber contacts said first bump-stop structure and said second snubber contacts said second bump-stop structure.

* * * * *